(12) United States Patent
Laimböck et al.

(10) Patent No.: US 6,729,289 B1
(45) Date of Patent: May 4, 2004

(54) INTERNAL COMBUSTION ENGINE

(75) Inventors: Franz Laimböck, Thal (AT); Christian Spanner, Kirchlandl (AT)

(73) Assignee: AVL List GmbH, Graz (AT)

( * ) Notice: Subject to any disclaimer, the term of this patent is extended or adjusted under 35 U.S.C. 154(b) by 1 day.

(21) Appl. No.: 10/301,852

(22) Filed: Nov. 22, 2002

(30) Foreign Application Priority Data

Nov. 23, 2001 (AT) ......................................... 912/2001 U

(51) Int. Cl.[7] .............................................. F02B 75/06
(52) U.S. Cl. .................................................. 123/192.2
(58) Field of Search ........................ 74/604, 603, 590; 123/192.2, 192.1, 55.4

(56) References Cited

U.S. PATENT DOCUMENTS

| | | | |
|---|---|---|---|
| 4,517,933 A | * | 5/1985 | Yasutake .................... 123/54.4 |
| 4,940,026 A | | 7/1990 | Fisher |
| 5,189,993 A | | 3/1993 | Schneider |
| 5,927,242 A | | 7/1999 | Kollock |
| 6,295,962 B1 | * | 10/2001 | Walker .................... 123/192.2 |

FOREIGN PATENT DOCUMENTS

| | | | |
|---|---|---|---|
| DE | 539771 | 12/1931 | |
| DE | 31 20 190 | 5/1982 | |
| DE | 4443707 | 6/1995 | |
| JP | 59175647 A | * 10/1984 | ............ F16F/15/24 |
| JP | 62052236 | 3/1987 | |

* cited by examiner

Primary Examiner—Tony M. Argenbright
Assistant Examiner—Hyder Ali
(74) Attorney, Agent, or Firm—Dykema Gossett PLLC

(57) ABSTRACT

In an internal combustion engine having at least two working pistons, each reciprocating in one cylinder and acting on a crankshaft through one connecting rod each and with at least one balance piston movably mounted in a balance cylinder of its own for balancing the inertial forces, the balance piston is driven by the crankshaft through a balance connecting rod, the crank of the balance piston being disposed between the cranks of the two working pistons. The cylinders of the working pistons are disposed in a "V" arrangement and the axes of the cylinders of the working pistons are positioned at an angle of $0°<\alpha<45°$ to one another, the axis of the balance cylinder being arranged in a first center plane including the crankshaft axis between the two cylinders of the working pistons.

11 Claims, 4 Drawing Sheets

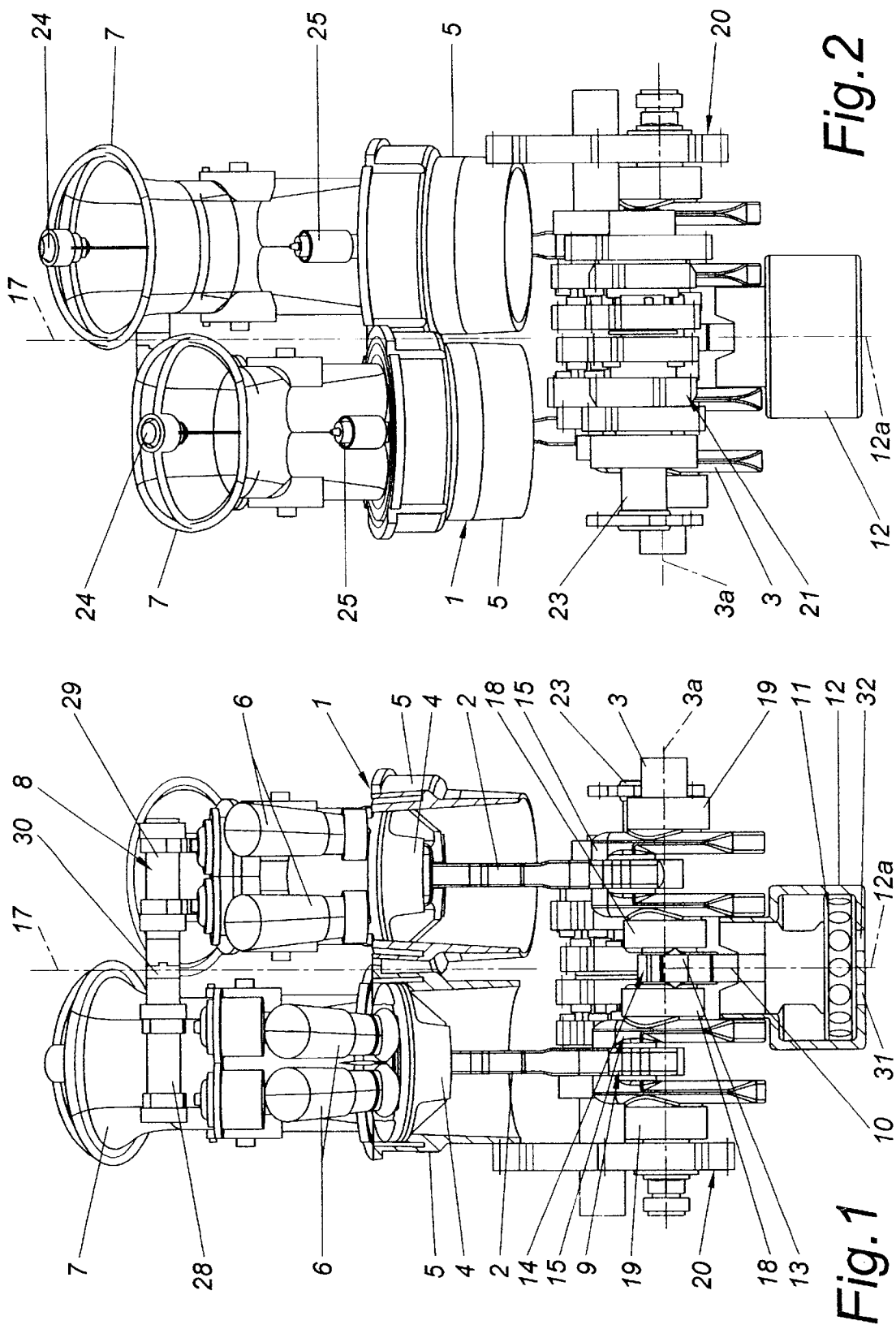

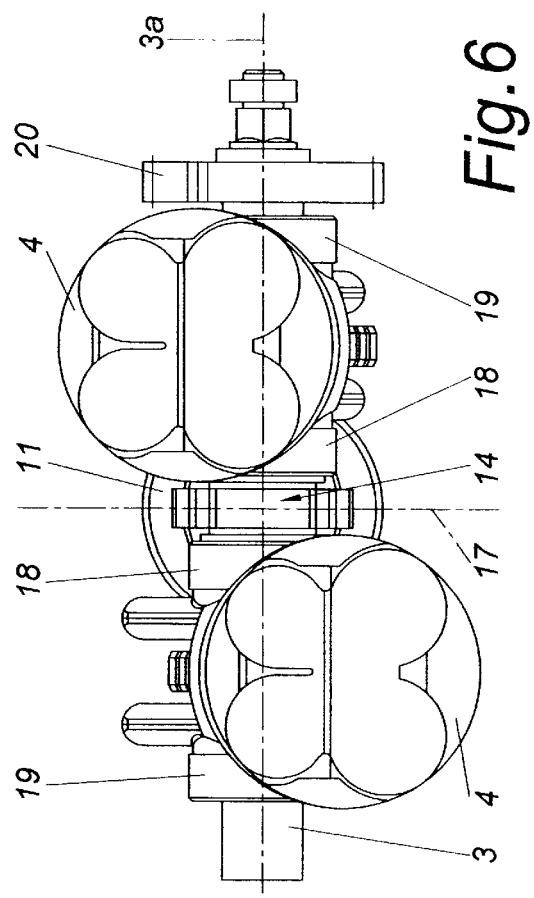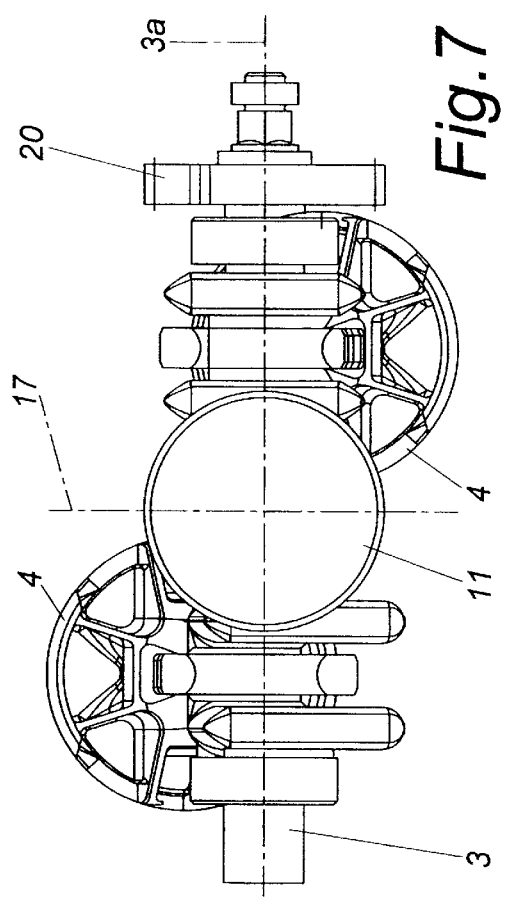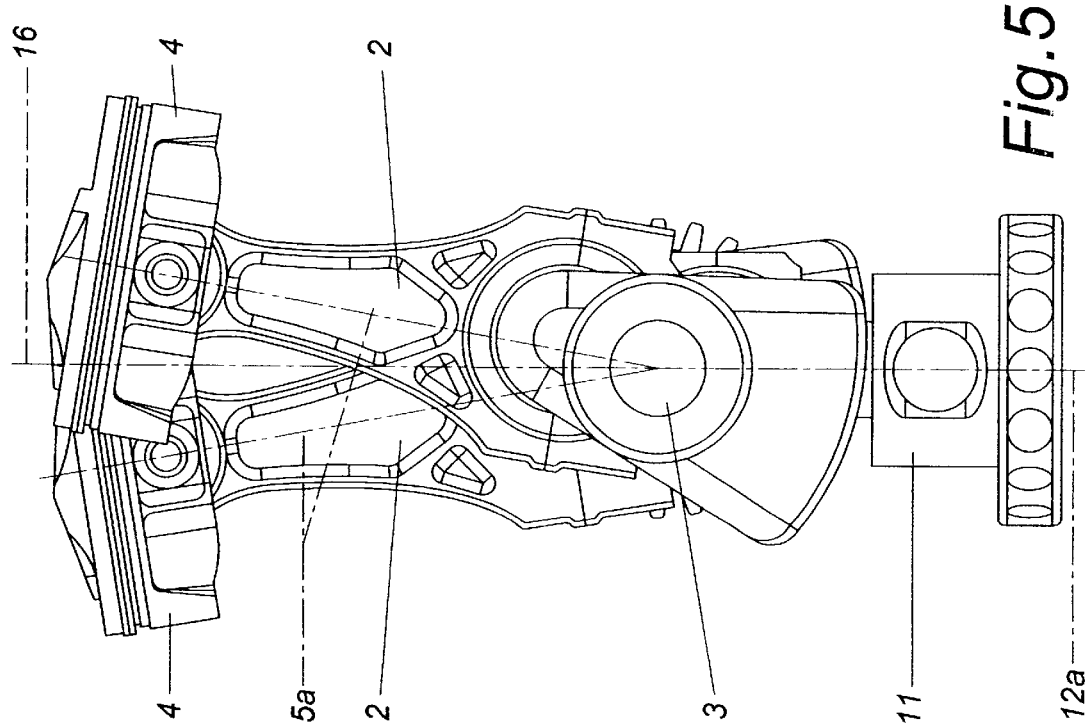

INTERNAL COMBUSTION ENGINE

BACKGROUND OF THE INVENTION

The invention relates to an internal combustion engine with at least two working pistons reciprocating each in one cylinder and acting on a crankshaft through one connecting rod each and with at least one balance piston movably mounted in a balance cylinder for balancing the inertial forces, said balance piston being driven by the crankshaft through a balance connecting rod and the crank of the balance piston being disposed between the cranks of the two working pistons.

DESCRIPTION OF PRIOR ART

JP 62-052236 A discloses an internal combustion engine of the type mentioned herein above. The internal combustion engine is provided with two cylinders connected in series. The balance piston is disposed in the region of one cylinder of a working piston and the crankshaft is carried on three bearings. No crankshaft bearing is provided between the connecting rod of the working piston and the adjacent balance connecting rod of the balance piston. Although inertial forces are balanced by the one-sided arrangement of the balance piston, a resultant tilting moment is created normal to the crankshaft. As the working cylinders are connected in series and a driver gear for driving camshafts lying on the top is disposed between the two working cylinders, the construction is relatively bulky which is particularly problematic when used in motorcycles.

Similar internal combustion engines with at least two cylinders connected in series and one balance piston also form the subject of the publications DE 31 20 190 A, U.S. Pat. No. 5,927,242 A, U.S. Pat. No. 5,189,993 A, U.S. Pat. No. 4,940,026 A and DE 44 43 707 A.

SUMMARY OF THE INVENTION

With an internal combustion engine of the type mentioned herein above, it is the object of the present invention to achieve, in the most space saving and simplest manner possible, a balance of the inertial forces of the first and second order of magnitude.

This is achieved in accordance with the invention in that the cylinders of the working pistons are disposed in a "V" arrangement and that the cylinder's axes of the cylinders of the working pistons are positioned at an angle of $0°<\alpha<45°$ to one another, the axis of the balance cylinder being arranged in a first center plane including the crankshaft axis between the two cylinders of the working pistons and wherein the following applies:

$$\sum_{i=1}^{n} r_{Ai} \cdot m_{Ai} = \sum_{j=1}^{z} r_j \cdot m_j \text{ and } \frac{r_A}{l_A} = \frac{r}{l}$$

$r_A$ being the radius of the crank of the balance piston, r the radius of the crank of the working piston, $m_A$ the mass of the balance piston, m the mass of the working piston, $l_A$ the length of the balance connecting rod, l the length of the connecting rod of the working piston, n the number of balance pistons and z the number of working pistons. A complete balance of the inertial forces of the first and second order of magnitude is thus achieved. The "V" arrangement of the axes of the two working cylinders allows for a very tight arrangement of the cylinders so that space may be saved. A slight inclination of the axes of the cylinders toward each other will do. The axes of the cylinders of the working pistons should thereby preferably be positioned at an angle from 10° to 30°, preferably of approximately 18°. In order to keep tilting moments oriented normal to the axis of the crankshaft as low as possible, it is particularly advantageous to have the axis of the balance cylinder arranged in a second center plane oriented normal to the axis of the crankshaft between two working pistons.

When the mass of the crankshaft is low, a particularly slight deflection of the crankshaft may be achieved by arranging one respective crankshaft bearing on either side and directly after the crank of the balance piston. Thus, one respective crankshaft bearing is provided between the connecting rod of each working piston and the connecting rod of the balance piston.

In accordance with the invention, the balance piston may also be configured as a pumping or a suction piston. In this way, the balance piston is capable of performing an additional function, which permits to save additional sets. It is particularly advantageous when balance piston and balance cylinder form a suction pump for evacuating the crankcase. The balance piston may thus be utilized to evacuate the crankcase during a dry sump lubrication for example. In another variant of the invention, the balance piston and the balance cylinder may form a pressure generating device for compressing the inside of the crankcase. As a result thereof, the balance piston may also be utilized to pre-compress the mixture.

In order to achieve regular ignition intervals between the two working cylinders a particular advantage is obtained when the throw of the cranks of the working pistons corresponds to the angle $\alpha$ of the cylinders' axes.

In a further realization of the invention there may be provided that at least two gas exchange valves of different cylinders are actuatable through a common camshaft. Preferably, the common camshaft is thereby configured in two parts and even more preferably the two camshaft parts are joined together by an Oldham coupling in the region of the second center plane.

BRIEF DESCRIPTION OF THE DRAWINGS

The invention is explained herein below in closer detail with reference to the drawings wherein:

FIG. 1 is a lengthwise section of the internal combustion engine of the invention, FIG. 2 is a side view of the internal combustion engine, FIG. 5 is a front view of the crankshaft and of the piston of the internal combustion engine, FIG. 6 is a top view of the crankshaft, FIG. 7 is a bottom view of the crankshaft.

DETAILED DESCRIPTION OF THE PREFERRED EMBODIMENTS

Figure 4:
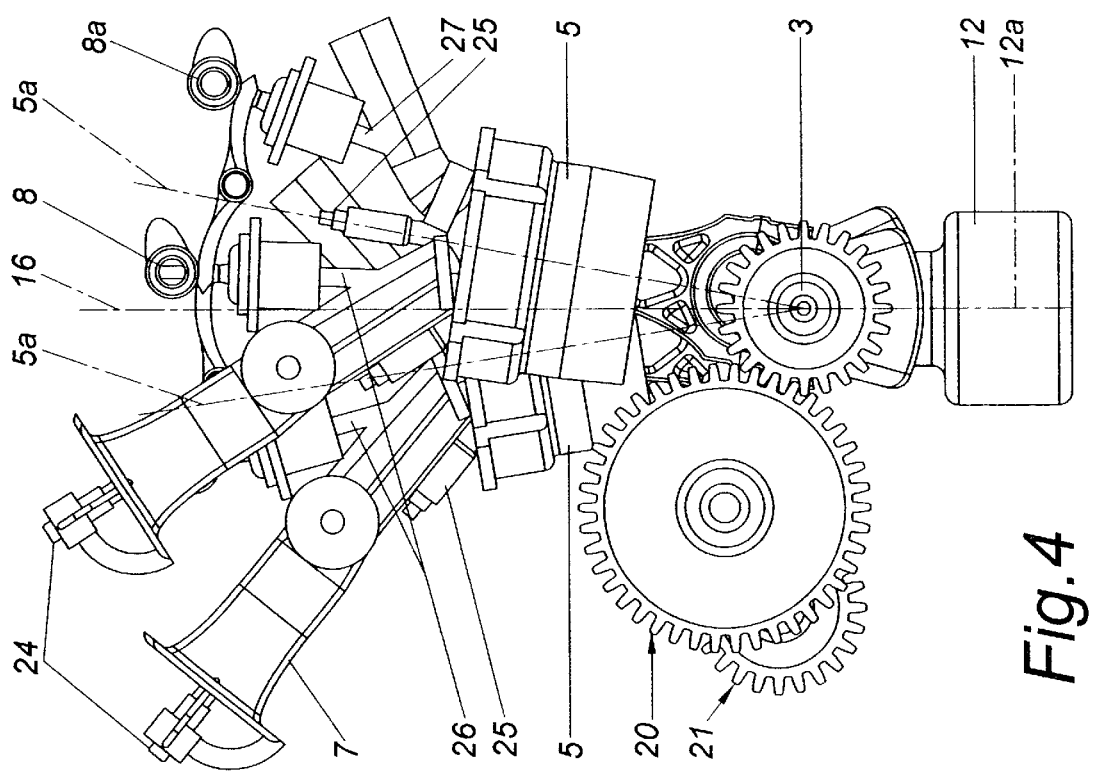
FIG. 4 is a second front view of the internal combustion engine.

The internal combustion engine 1 is provided with two working pistons 4 acting on a crankshaft 3 through one connecting rod 2 each. Each working piston 4 is reciprocatingly carried in a cylinder 5. Each cylinder 5 has its own cylinder head containing exhaust pipes 6, suction heads 7 and valve actuating devices. The only valve actuating devices illustrated in the FIGS. are the camshafts 8, 8a and 8b.

A balance connecting rod 10 of a balance piston 11 which is movably mounted in a balance cylinder 12 is connected to the crankshaft 3 between the two connecting rod eyes 9 of the connecting rods 2 of the working pistons 4. The connecting rod eye 13 of the balance connecting rod 10 acts upon a crank 14 of the crankshaft 3 that is disposed approximately in the center between the cranks 15 of the working pistons 4.

Figure 3:
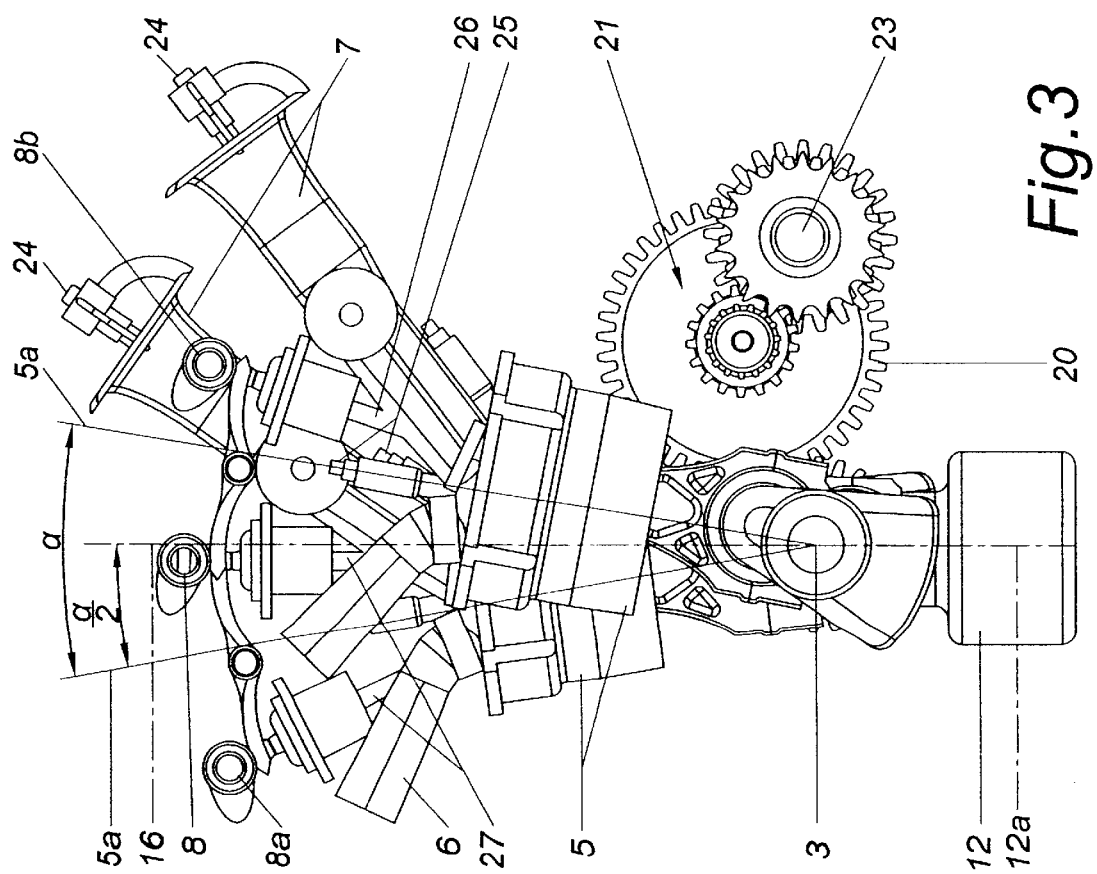
FIG. 3 is a first view of the internal combustion engine.
Figure 9:
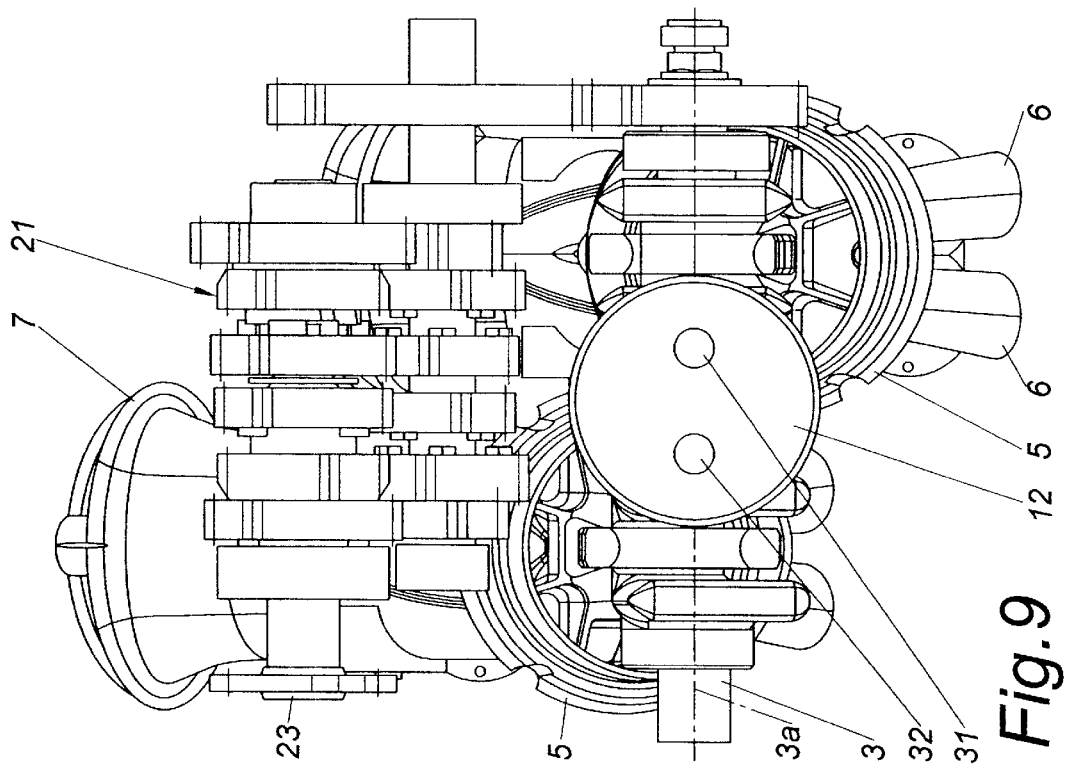
FIG. 8 is a top view of the internal combustion engine and FIG. 9 is a bottom view of the internal combustion engine.
Figure 8:
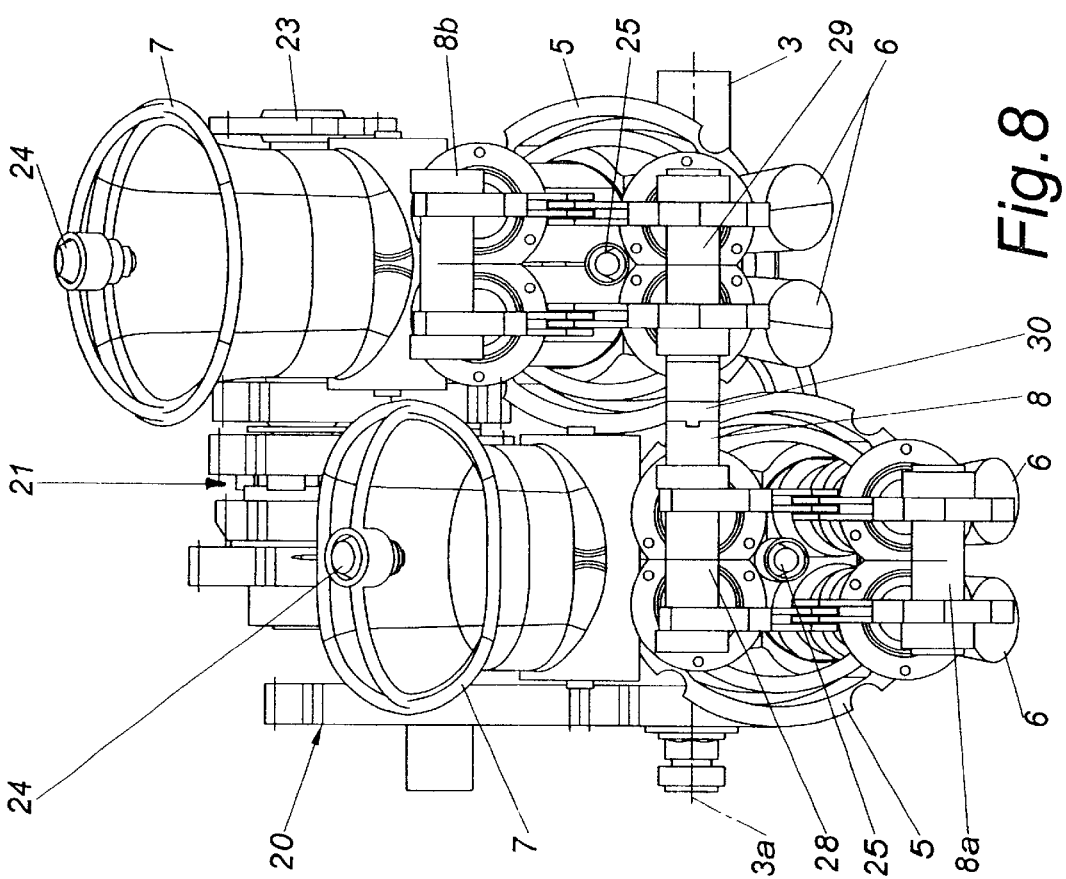

Viewed in the direction of the crankshaft 3, the cylinders 5 of the working pistons 4 are arranged in a V, the axes 5a of the cylinders 5 being positioned at an angle α of about 15°, as may be surveyed from FIG. 3. By inclining the cylinders' axes 5a the cylinders 5 may be placed in a particularly tight arrangement. The internal combustion engine 1 still has the typical appearance of a V engine arrangement.

The axis 12a of the balance cylinder 12 is arranged in a first center plane 16 that includes the axis 3a of the crankshaft between the two cylinder's axes 5a. The axis 12a of the balance cylinder 12 is further located in the region of a second center plane 17 which is oriented normal to the axis 3a of the crankshaft between the two cylinders 5. As a result thereof, the tilting moments of the crankshaft 3 are kept as low as possible.

In order to balance inertial forces of the first and second order of magnitude as completely as possible, two conditions must be fulfilled. On the one hand the following must apply:

$$\sum_{i=1}^{n} r_{Ai} \cdot m_{Ai} = \sum_{j=1}^{z} r_j \cdot m_j$$

$r_A$ being the radius of the crank 14 of the balance piston 11, r the radius of the crank 15 of the working piston 4, $m_A$ the mass of the balance piston 11, m the mass of the working piston 4, n the number of the balance pistons 11 and z the number of the working pistons 4. On the other hand, the connecting rod conditions of working piston 4 and balance piston 11 must be the same, i.e., the following must apply:

$$\frac{r_A}{l_A} = \frac{r}{l}$$

$l_A$ being the length of the connecting rod 10 of the balance piston 11 and l the length of the connecting rod of the working piston 4.

As may be more particularly surveyed from FIG. 1, one crankshaft bearing 18 is located between the crank 15 of the working piston 4 and the crank 14 of the balance piston 11 respectively. Additional outer crankshaft bearings are indicated at 19. As the crankshaft 3 is carried on four bearings, the deflection is kept very low.

Through spur gears 20, the crankshaft 3 drives a gearing 21 the driven shaft of which is indicated at 23.

The numeral 24 designates injection devices into the suction heads 7 and the numeral 25 ignition devices discharging into the combustion chambers.

In the exemplary embodiment shown, the intake valves 26 and the exhaust valves 27 of various cylinders 5 located in the region of the first center plane 16 are actuated by a common central camshaft 8. The camshaft 8 consists of two camshaft parts 28, 29 that are connected by an Oldham coupling 30 so as to rotate in unison. The Oldham coupling 30 prevents tensions resulting from different thermal expansions between the two cylinders 5 from being transmitted to the camshaft 8.

In order to achieve regular ignition intervals between the two cylinders 5, the throw between the cranks 15 of the working pistons 4 corresponds to the inclination angle a of the cylinders' axes 5a.

It is particularly advantageous when the balance piston 11 and the balance cylinder 12 are configured as a pumping or a suction device. Additional sets may thus be dispensed with. In order to make this possible, the cylinder is provided with inlet and outlet ports 31, 32 to which intake and exhaust lines provided with check valves, diaphragm valves for example, (not shown) are leading. The balance piston 11 may for example be configured as a suction piston for evacuating the crankcase during dry sump lubrication. It is also possible that the balance piston 11 performs the function of a pumping piston for supercharging the crankcase in a simple manner.

What is claimed is:

1. An internal combustion engine with at least two working pistons reciprocating each in one cylinder and acting on a crankshaft through one connecting rod each and with at least one balance piston movably mounted in a balance cylinder for balancing the inertial forces, said balance piston being driven by the crankshaft through a balance connecting rod and a crank of the balance piston being disposed between the cranks of the two working pistons, wherein the cylinders of the working pistons are disposed in a "V" arrangement and wherein the cylinder's axes of the cylinders of the working pistons are positioned at an angle of 0°<α<45° to one another, the axis of the balance cylinder being arranged in a first center plane including a crankshaft axis between the two cylinders of the working pistons and wherein the following applies:

$$\sum_{i=1}^{n} r_{Ai} \cdot m_{Ai} = \sum_{j=1}^{z} r_j \cdot m_j \text{ and } \frac{r_A}{l_A} = \frac{r}{l}$$

$r_A$ being the radius of the crank of the balance piston, r the radius of the crank of the working piston, $m_A$ the mass of the balance piston, m the mass of the working piston, $l_A$ the length of the balance connecting rod, l the length of the connecting rod of the working piston, n the number of the balance pistons and z the number of working pistons.

2. An internal combustion engine according to claim 1, wherein the axes of the cylinders of the working pistons are positioned at an angle α from 10° to 30°.

3. An internal combustion engine according to claim 2, wherein the axes of the cylinders of the working pistons are positioned at an angle α of approximately 18°.

4. An internal combustion engine according to claim 1, wherein the axis of the balance cylinder is arranged in a second center plane oriented normal to the axis of the crankshaft between two working pistons.

5. An internal combustion engine according to claim 1, wherein one respective crankshaft bearing is arranged on either side and directly after the crank of the balance piston.

6. An internal combustion engine according to claim 1, wherein the balance piston is configured as one- or two-sided pumping or suction piston.

7. An internal combustion engine according to claim 6, wherein the balance piston and the balance cylinder form a suction pump for evacuating a crankcase.

8. An internal combustion engine according to claim 6, wherein the balance piston and the balance cylinder form a pressure generating device for compressing the inside of the crankcase.

9. An internal combustion engine according to claim 1, wherein the throw of the cranks of the working pistons corresponds to the angle $\alpha$ of the cylinders' axes of the cylinders.

10. An internal combustion engine according to claim 1, wherein two gas exchange valves of various cylinders are actuatable through a common camshaft.

11. An internal combustion engine according to claim 1, wherein the common camshaft is configured in two parts and wherein the two camshaft parts are joined together by an Oldham coupling in the region of the second center plane.

* * * * *